United States Patent
Bonta

(10) Patent No.: US 7,403,496 B2
(45) Date of Patent: Jul. 22, 2008

(54) METHOD AND APPARATUS FOR CONGESTION RELIEF WITHIN AN AD-HOC COMMUNICATION SYSTEM

(75) Inventor: Jeffrey D. Bonta, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 689 days.

(21) Appl. No.: 10/951,465

(22) Filed: Sep. 28, 2004

(65) Prior Publication Data

US 2006/0067257 A1    Mar. 30, 2006

(51) Int. Cl.
*H04B 7/208* (2006.01)
(52) U.S. Cl. .................. 370/310; 370/229; 370/344; 455/453
(58) Field of Classification Search .......... 370/310, 370/229, 237, 344, 395.1, 232, 235, 236, 370/338; 455/453
See application file for complete search history.

(56) References Cited

U.S. PATENT DOCUMENTS

| | | | | |
|---|---|---|---|---|
| 6,064,892 | A * | 5/2000 | Miyagawa et al. | 455/560 |
| 6,424,620 | B1 * | 7/2002 | Nishihara | 370/229 |
| 6,650,619 | B1 * | 11/2003 | Schuster et al. | 370/230 |
| 6,731,613 | B1 * | 5/2004 | Provance | 370/311 |
| 7,295,516 | B1 * | 11/2007 | Ye | 370/232 |
| 2002/0102978 | A1 * | 8/2002 | Yahagi | 455/437 |
| 2003/0099195 | A1 * | 5/2003 | Lee | 370/229 |
| 2006/0067283 | A1 * | 3/2006 | So et al. | 370/338 |

OTHER PUBLICATIONS

Liu, Kai et al.: A reservation-based multiple access protocol with collision avoidance for wireless multihop ad hoc networks, Communications, 2003. ICC '03. IEEE International Conference on , vol. 2, May 11-15, 2003, pp. 1119-1123 vol. 2.

Linifang Zhang; Zenghua Zhao; Yantai Shu; Lei Wang; Yang, O.W. W.: "Load balancing of multipath source routing in ad hoc networks", Communications, 2002. ICC 2002. IEEE International Conference on , vol. 5 , Apr. 28-May 2, 2002, pp. 3197-3201 vol. 5.

Marsan, M.A.; Chiasserini, C.F.; Nucci, A.; Carello, G.; De Giovanni, L.: "Optimizing the topology of Bluetooth wireless personal area networks"; INFOCOM 2002. Twenty-First Annual Joint Conference of the IEEE Computer and Communications Societies. Proceedings. IEEE , vol. 2 , Jun. 23-27, 2002, pp. 572-579 vol. 2.

* cited by examiner

*Primary Examiner*—CongVan Tran

(57) ABSTRACT

A network reconfiguration protocol is provided that is initiated by the congested communication node (300). When a node (300) determines it is a bottleneck node, it will then analyze complaints from other nodes to determine which nodes are being affected by the bottleneck. The congested node will request the reconfiguration of select neighboring communication nodes in the ad hoc network to use an alternate channel (e.g., frequency) for future communications. Because nodes experiencing poor transmission/reception due to a bottleneck node are reconfigured to operate on a different channel, congestion is greatly reduced.

18 Claims, 4 Drawing Sheets

METHOD AND APPARATUS FOR CONGESTION RELIEF WITHIN AN AD-HOC COMMUNICATION SYSTEM

FIELD OF THE INVENTION

The present invention relates generally to ad-hoc communication systems, and in particular, to a method and apparatus for congestion relief within such ad-hoc communication systems.

BACKGROUND OF THE INVENTION

Ad-hoc networks allow mobile nodes to form a multi-hop network for peer-to-peer communication. Typical ad-hoc system protocols use a common channel for communication between all nodes. The use of a common channel puts a limitation on the network performance. For example, it has been shown that as the node density increases, the network performance is rapidly degraded due to channel contention. This is because when two nodes in close proximity are communicating, use of a common channel has the effect of preventing multiple surrounding nodes from communicating amongst them. This creates a ripple effect on the congestion in the network. This is illustrated in FIG. 1 where upstream nodes 101-104 are actively communicating with downstream nodes 105-108, respectively. All nodes 101-109 utilize the same channel (frequency/timeslot/code). As is evident all communication passes through bottleneck node 109. This bottleneck adds appreciable latency to the system, preventing multiple nodes 101-108 from adequately communicating between each other. Therefore a need exists for a method and apparatus for congestion relief an ad-hoc communication system that alleviates congestion caused by bottleneck nodes.

DETAILED DESCRIPTION OF THE DRAWINGS

Figure 1:
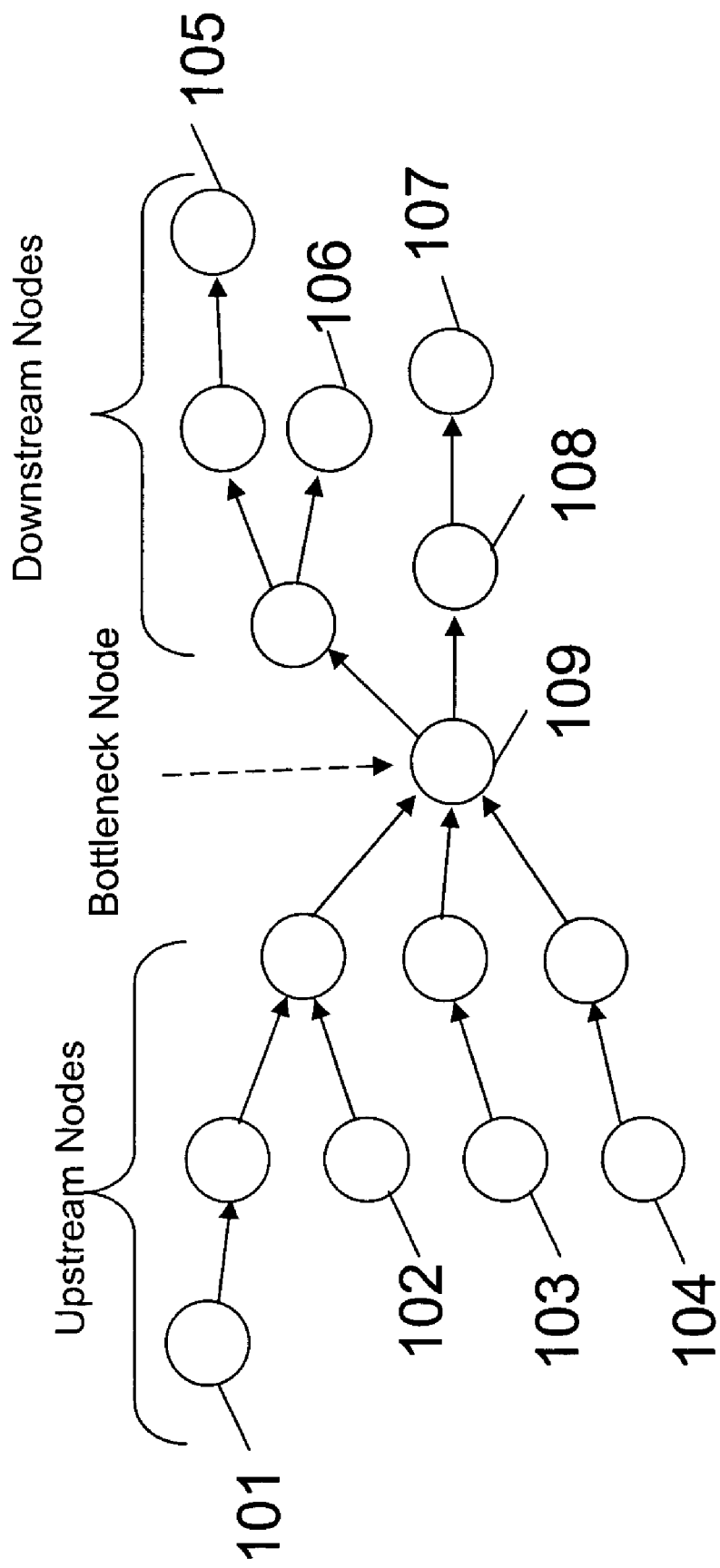
FIG. 1 is a block diagram of an ad-hoc communication system illustrating a prior-art bottleneck node.

To address the above-mentioned need a method and apparatus for congestion relief within an ad-hoc communication system is provided herein. In particular, a network reconfiguration protocol is provided that is initiated by the congested communication node. When a node determines it is a bottleneck node, it will then analyze complaints from other nodes to determine which nodes are being affected by the bottleneck. The congested node will request the reconfiguration of select neighboring communication nodes in the ad hoc network to use an alternate channel (e.g., frequency) for future communications. Because nodes experiencing poor transmission/reception due to a bottleneck node are reconfigured to operate on a different channel, congestion is greatly reduced.

The present invention encompasses a method for congestion relief within an ad-hoc communication system. The method comprises the steps of determining that congestion exists for data sent from a transmitting node to a first downstream node, sending a message to the first downstream node indicating that the transmitting node is experiencing congestion, and receiving a second message from the first downstream node directing the transmitting node to potentially switch frequencies, causing the transmitting node to route data through a second downstream node, bypassing the first downstream node.

The present invention additionally encompasses a method for performing congestion relief within an ad-hoc communication system. The method comprises the steps of receiving, at a receiving node, a message from an upstream node that the upstream node is experiencing congestion, determining if the receiving node is experiencing congestion, and if the receiving node is experiencing congestion, sending the message to a downstream node, otherwise performing congestion relief for the upstream node.

The present invention additionally encompasses an apparatus comprising logic circuitry determining that congestion exists for data sent from a transmitting node to a first downstream node, a transmitter sending a message to the first downstream node indicating that the transmitting node is experiencing congestion, and receiving circuitry receiving a second message from the first downstream node directing the transmitting node to potentially switch frequencies, causing the transmitting node to route data through a second downstream node, bypassing the first downstream node.

Finally, the present invention encompasses a receiving node comprising a receiver receiving a first message from an upstream node that the upstream node is experiencing congestion, logic circuitry determining if the receiving node is experiencing congestion, and a transmitter sending the first message to a downstream node if the receiving node is experiencing congestion otherwise sending a second message to the upstream node directing the upstream node to change channels.

Prior to taking any action that reduces system congestion caused by bottleneck nodes, a node first needs to make a determination that it is indeed the bottleneck node. A node is considered a bottleneck node if it is not experiencing congestion yet receives an indication that upstream nodes are experiencing congestion. At the earliest indication of congestion in a node (e.g. when a threshold is reached for outgoing buffered data, a congestion indication is reported), the congested node will send a CONGESTION_INQUIRY message to its downstream node complaining about the congestion and asking it if it also has a congestion problem. This CONGESTION_INQUIRY message will include an indication of the desired destination node and/or Quality of Service (QOS) information describing latency requirements of its delayed buffered data. The downstream node will determine if its congestion level is similar or worse than that of the congested node. If the downstream node is not congested, then it will consider itself a bottleneck node. If, however, the downstream node is at least as congested as the upstream node, it will pass on the CONGESTION_INQUIRY message to its downstream node. The process continues until a node determines that it is a bottleneck node.

Once a node determines that it is a bottleneck node, it can take measures to reduce system interference. In particular, when a node determines it is a bottleneck node, it will then analyze complaints from other nodes to determine which nodes are being affected by the bottleneck. The congested node will request the reconfiguration of select neighboring communication nodes in the ad hoc network to use an alternate RF channel for future communications. This process is illustrated in FIG. 2.

Figure 2:
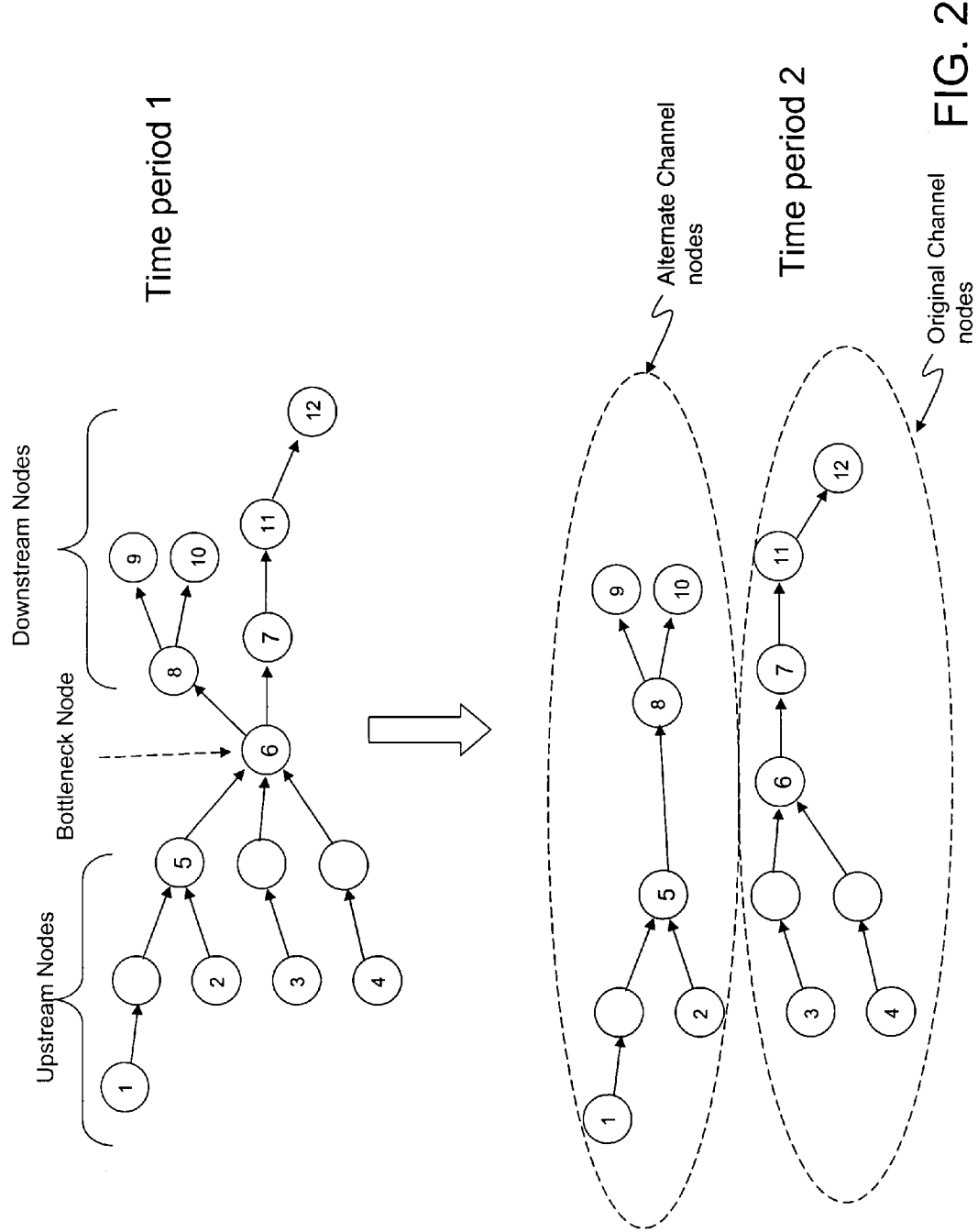
FIG. 2 is a block diagram of an ad-hoc communication system illustrating the removal of a bottleneck node.

FIG. 2 is a block diagram of an ad-hoc communication system, illustrating the removal of a bottleneck node. During time-period 1 nodes 1-4 are actively communicating with nodes 9-12, respectively, when node 6 determines that it is a bottleneck node. In response, node 6 builds an internal map of the upstream nodes, their desired targets, their QOS requirements, and any intermediate nodes it can determine from the routing protocol or routing tables (e.g. DSR routing protocol requires the complete path from source to destination to be specified in any message whereas AODV requires the next downstream node to be stored in the routing tables for the specified destination).

The bottleneck node will make an assessment about any upstream node and downstream node along the path to the specified destination that should be moved to an alternate RF channel. In particular, a plurality of upstream and downstream nodes is chosen to move to a different channel. The determination as to which nodes are to move to the different channel is made by examining the QOS requirements of each data flow passing through the bottleneck node as well as routing information available for each data flow. The bottleneck node will first select a data flow based on QOS requirements that does not require real-time communication. If more than one non-real time flow exists, the flow with the requirement for the lowest data rate will be chosen to move to the alternate RF channel. If a non-real time flow does not exist, then the flow with the requirement for the lowest data rate will be chosen to move to the alternate RF channel. In either case, if there are multiple flows with the same QOS requirement, then the available routing information will help with the selection of nodes to move. First, if the source node or the destination node for a flow is the first tier upstream node or downstream node respectively, then that flow will be chosen to move. The final deciding factor in selecting a flow to move is the number of nodes between the bottleneck node and the source node of the possible flows to move. The one with the least hops is chosen.

Once a plurality of nodes is chosen to move to an alternate channel, the bottleneck node will inform the plurality of nodes (alternate channel nodes) of the need to switch channels with a PATH_SWITCH message containing a time stamp to indicate when the channel switch should occur, a communication route of IP addresses that skips the bottleneck node, and the RF channel that should be used. In the preferred embodiment of the present invention the time stamp for switching to an alternate channel is far enough out in time to enable all impacted alternate channel nodes to schedule the communication time on the new channel. The bottleneck node will communicate the PATH_SWITCH message to the alternate channel nodes utilizing its own routing table entries for those nodes. The bottleneck node could also establish a multicast address with the alternate channel nodes to streamline future communication since the alternate channel nodes will be a part of a private network.

At the designated time stamp, the alternate channel nodes will update their routing tables to de-prioritize or possibly even remove the bottleneck node as an intermediate hop. They will then create a schedule based on a preset pattern to alternatively switch their transceiver between the newly proposed channel (e.g., a newly proposed RF carrier) and original channel.

The result of the alternate channel nodes switching to an alternate channel is shown in time-period 2 of FIG. 2. Nodes 1, 2, 5, 8, 9, 10, and 12 are now operating using the alternate channel. Thus, node 5 no longer communicates with node 6, instead passing all communication through node 8. Because node 8 is a greater distance from node 5, the link between the nodes may not be as robust as the original link to node 6, however, the tradeoff is that all nodes 1-12 will experience no bottleneck. Thus, the use of alternating channel switching may reduce the effective throughput for some nodes, but will enable a stream of data to bypass a congested node while still allowing other simultaneous communication streams to share common nodes.

A bottleneck node may signal an end to the congestion, thus enabling the alternate path to be torn down in favor of a higher effective throughput through the old bottleneck node. This is accomplished by the bottleneck node (i.e., node 6) making a determination that communication received from node 5 will no longer cause a bottleneck. This may be accomplished by detecting an absence of relay packets as measured by incoming packet rate.

In the preferred embodiment of the present invention the alternate channel nodes will determine whether they can successfully bypass the bottleneck node by simply trying to directly communicate with the next node in the communication route received in the PATH_SWITCH message. This may require communication using a lower, more robust data rate to improve the reliability of the communication. In an alternate embodiment, the upstream nodes affected by the congestion could have included a list of nodes in the CONGESTION_INQUIRY message that they already were capable of communicating with. The bottleneck node could then only send a PATH_SWITCH message if it determined that a possible route exists between the first tier upstream and downstream nodes. In either case, a change in the channel used between the upstream and downstream node will enable contention free communication leading to reduced congestion in the bottleneck node.

Figures 3, 4:
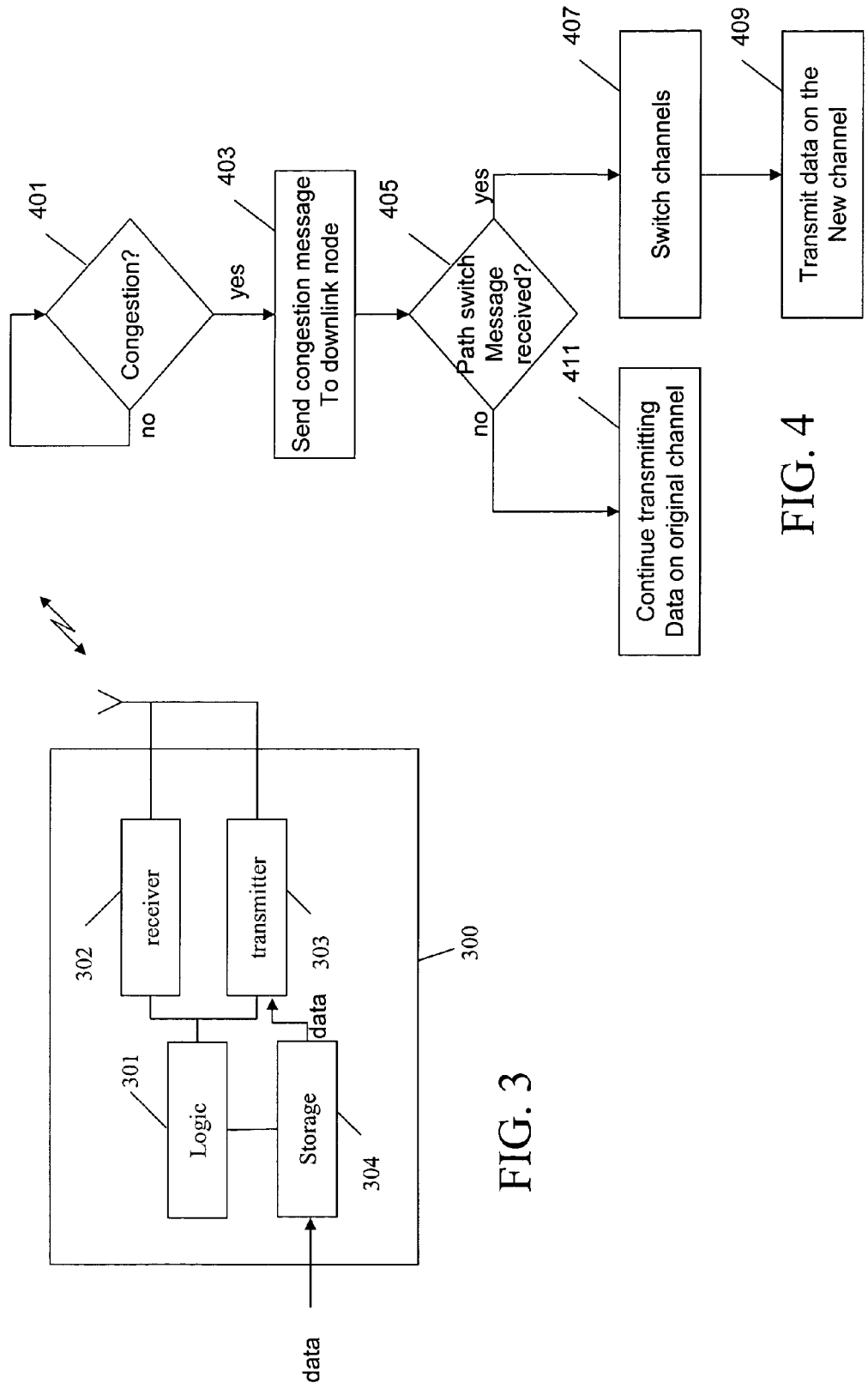
FIG. 3 is a block diagram of a node within an ad-hoc communication system.
FIG. 4 is a flow chart showing operation of the node of FIG. 3.

FIG. 3 is a high-level block diagram of node 300. Node 300 may serve as a source node, a destination node, or a relaying node. All nodes 1-12 (whether transmitting, receiving, or relaying) contain the elements shown in node 300. As shown, node 300 comprises logic circuitry 301, receive circuitry 302, transmit circuitry 303, and storage 304. Logic circuitry 301 preferably comprises a microprocessor controller, such as, but not limited to a Motorola PowerPC microprocessor, available from Motorola, Inc. In the preferred embodiment of the present invention logic circuitry 301 serves as means for controlling node 300, and as means for analyzing message content to determine any actions needed and performing those actions. Additionally receive and transmit circuitry 302-303 are common circuitry known in the art for communication utilizing a well known communication protocol, and serve as means for transmitting and receiving messages. For example, receiver 302 and transmitter 303 may be well known neuRFon™ transmitters that utilize the neuRFon™ communication system protocol. Other possible transmitters and receivers include, but are not limited to transceivers utilizing the Bluetooth, IEEE 802.11, or HyperLAN protocols. Finally, storage 304 serves as means for storing routing tables, data, QOS information describing latency requirements of its delayed buffered data, and information contained within all CONGESTION_INQUIRY and PATH_SWITCH messages.

FIG. 4 is a flow chart showing operation of the node of FIG. 3 during congestion. The logic flow begins at step 401 when logic circuitry 301 determines if congestion exists for data sent to the downstream node. As discussed above, this step preferably comprises logic circuitry 301 accessing storage 304 and determining that a threshold is reached for the amount of outgoing buffered data. If the amount of outgoing, buffered data is above the threshold then it is determined that congestion exists and the logic flow continues to step 403, otherwise the logic flow returns to step 401.

At step 403 a congestion message (CONGESTION_INQUIRY) is sent via transmitter 303 to its downstream node indicating that the node is experiencing congestion. The congestion message comprises the identity of the destination node and QOS information describing latency requirements of its delayed buffered data. The congestion message will cause the downstream nodes to make a determination as to whether or not they are the source of congestion. Eventually a downstream node will determine that it is the source of congestion and make an assessment about any upstream node and downstream node along the path to the specified destination that should be moved to an alternate RF channel. Therefore, at step 405 a determination is made by logic circuitry 301 (after a predetermined amount of time) as to whether or not receiver 302 received a second message (PATH_SWITCH message), and if so, the logic flow continues to step 407 where the transmitting and receiving channels are switched and data is transmitted on the new channel to a second downstream node (step 409) bypassing the congested downstream node. If, however, no PATH_SWITCH message is received, data continues to be transmitted on the original channel (step 411).

As discussed above, and illustrated in FIG. 2, the sending of a CONGESTION_INQIRY message may cause node 300 to change downstream nodes in order to alleviate the congestion. Thus, the reception of a PATH_SWITCH message potentially causes the node to switch frequencies to bypass the congested node. As discussed above, logic circuitry 301 can determine whether it can successfully bypass the bottleneck node by simply trying to directly communicate with the next node in the communication route received in the PATH_SWITCH message, with or without out changing frequencies. Thus, any reception of a PATH_SWITCH message directs the node to bypass the congested node by either switching frequencies or communicating with the next node in the communication route on the same frequency. In either case, communication with the next node may require communication using a lower, more robust data rate to improve the reliability of the communication. In an alternate embodiment, the upstream nodes affected by the congestion could have included a list of nodes in the CONGESTION_INQUIRY message that they already were capable of communicating with. The bottleneck node could then only send a PATH_SWITCH message if it determined that a possible route exists between the first tier upstream and downstream nodes. In either case, a change in the channel used between the upstream and downstream node will enable contention free communication leading to reduced congestion in the bottleneck node.

Figure 5:
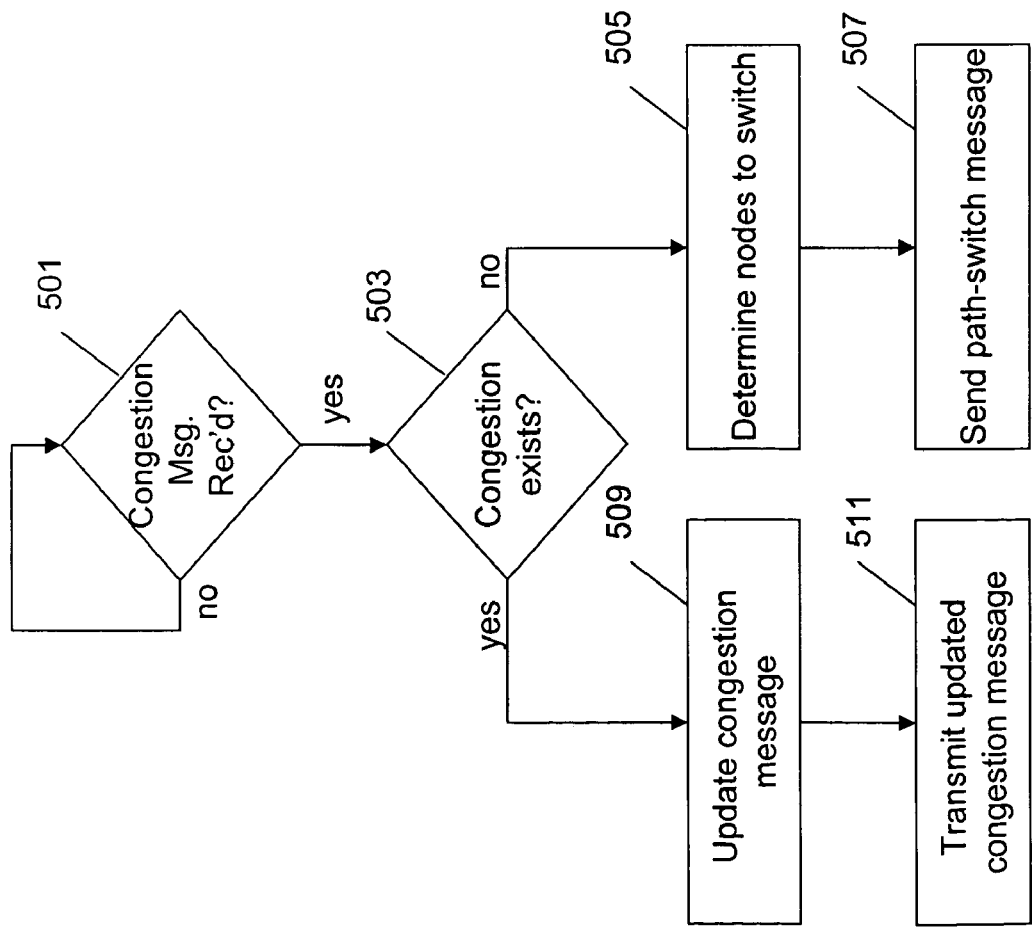
FIG. 5 is a flow chart showing operation of the node of FIG. 3.

FIG. 5 is a flow chart showing operation of the node of FIG. 3 when a congestion message is received. The logic flow begins at step 501 where logic circuitry 301 determines if receiver 302 received a congestion message from an upstream node. If not, the logic flow returns to step 501, otherwise the logic flow continues to step 503 where logic circuitry 301 analyzes storage 304 to determine if node 300 is at least as congested as the upstream node. If at step 503 it is determined that node 300 is at least as congested as the upstream node, the logic flow assumes that congestion exists and updates the congestion message (step 509). In particular, the congestion message is updated to comprise the worst congestion parameters for all upstream nodes and the congestion message is transmitted to its downstream node via transmitter 303 (step 511).

If at step 503, it is determined that congestion does not exist at node 300, the logic flow continues to step 505 where a determination is made as to which upstream and downstream nodes will be switched to an alternate channel (e.g., frequency). As discussed above, this determination is made by logic circuitry 301 by examining the QOS requirements of each data flow passing through the bottleneck node as well as routing information available for each data flow. The bottleneck node will first select a data flow based on QOS requirements that does not require real-time communication. If more than one non-real time flow exists, the flow with the requirement for the lowest data rate will be chosen to move to the alternate RF channel. If a non-real time flow does not exist, then the flow with the requirement for the lowest data rate will be chosen to move to the alternate RF channel. In either case, if there are multiple flows with the same QOS requirement, then the available routing information will help with the selection of nodes to move. First, if the source node or the destination node for a flow is the first tier upstream node or downstream node respectively, then that flow will be chosen to move. The final deciding factor in selecting a flow to move is the number of nodes between the bottleneck node and the source node of the possible flows to move. The one with the least hops is chosen. Finally, at step 507 a path-switch message is sent to the plurality of nodes, causing them to switch channels, routing data through a second downstream node.

While the invention has been particularly shown and described with reference to a particular embodiment, it will be understood by those skilled in the art that various changes in form and details may be made therein without departing from the spirit and scope of the invention. For example, if the ad hoc air interface uses codes, as in a CDMA access method, then the congestion relief occurs by assigning alternate channel nodes an alternative code rather than an alternative frequency. It is intended that such changes come within the scope of the following claims.

The invention claimed is:

1. A method for congestion relief within an ad-hoc communication system, the method comprising the steps of:
   determining that congestion exists for data sent from a transmitting node to a first downstream node;
   sending a message to the first downstream node indicating that the transmitting node is experiencing congestion; and
   receiving a second message from the first downstream node directing the transmitting node to switch frequencies, causing the transmitting node to route data through a second downstream node, bypassing the first downstream node;
   wherein the second message comprises a PATH_SWITCH message containing a time stamp to indicate when a channel switch should occur.

2. The method of claim 1 wherein the step of determining that congestion exists for data sent from the transmitting node comprises the step of determining that a threshold is reached for outgoing buffered data.

3. The method of claim 1 wherein the step of sending the message to the first downstream node comprises the step of sending a CONGESTION_INQUIRY message to the first downstream node, wherein the CONGESTION_INQUIRY message comprises an identification of a desired destination node and/or Quality of Service (QOS) information describing latency requirements of delayed buffered data.

4. The method of claim 1 wherein the step of receiving the second message from the first downstream node directing the transmitting node to switch frequencies comprises the step of receiving a PATH_SWITCH message containing a time stamp to indicate when a channel switch should occur and a communication route of IP addresses that skips the first downstream node.

5. The method of claim 1 wherein the step of receiving the second message from the first downstream node directing the data transmitting node to switch frequencies comprises the step of receiving a PATH_SWITCH message containing a time stamp to indicate when a channel switch should occur, a communication route of IP addresses that skips the first downstream node, and an RF channel that should be used.

6. The method of claim 1 further comprising the step of:
routing data through the second downstream node.

7. The method of claim 1 further comprising the steps of:
determining if transmitting node can successfully bypass the downstream node by trying to directly communicate with a next node in a communication route received in the second message.

8. A method for performing congestion relief within an ad-hoc communication system, the method comprising the steps of:
receiving, at a receiving node, a message from an upstream node that the upstream node is experiencing congestion;
determining if the receiving node is experiencing congestion; and
if the receiving node is experiencing congestion, sending the message to a downstream node, otherwise performing congestion relief for the upstream node;
wherein the step of performing congestion relief for the upstream node comprises the step of sending a PATH_SWITCH message containing a time stamp to indicate when a channel switch should occur, a communication route of IP addresses that skips the receiving node, and an RF channel that should be used.

9. The method of claim 8 wherein the step of receiving the message comprises the step of receiving a CONGESTION_INQUIRY message from the upstream node, wherein the CONGESTION_INQUIRY message comprises an indication of a desired destination node and/or Quality of Service (QOS) information describing latency requirements of delayed buffered data.

10. The method of claim 8 wherein the step of determining if the receiving node is experiencing congestion comprises the step of determining that a threshold is reached for outgoing buffered data.

11. The method of claim 8 wherein the step of performing congestion relief for the upstream node comprises the step of directing the upstream node to switch channels.

12. The method of claim 8 wherein the step of performing congestion relief for the upstream node comprises the step of directing the upstream node to switch RF channels.

13. An apparatus comprising:
logic circuitry determining that congestion exists for data sent from a transmitting node to a first downstream node;
a transmitter sending a message to the first downstream node indicating that the transmitting node is experiencing congestion; and
receiving circuitry receiving a second message from the first downstream node directing the transmitting node to switch frequencies, causing the transmitting node to route data through a second downstream node, bypassing the first downstream node wherein the second message comprises a PATH_SWITCH message containing a time stamp to indicate when a channel switch should occur.

14. The apparatus of claim 13 wherein the logic circuitry determines that congestion exists by determining that a threshold is reached for outgoing buffered data.

15. The apparatus of claim 13 wherein the second message comprises an identification of a desired destination node and/or Quality of Service (QOS) information describing latency requirements of delayed buffered data.

16. A receiving node comprising:
a receiver receiving a first message from an upstream node that the upstream node is experiencing congestion;
logic circuitry determining if the receiving node is experiencing congestion; and
a transmitter sending the first message to a downstream node if the receiving node is experiencing congestion otherwise sending a second message to the upstream node directing the upstream node to change channels, wherein the second message comprises a PATH_SWITCH message containing a time stamp to indicate when a channel switch should occur.

17. The apparatus of claim 16 wherein the first message comprises an indication of a desired destination node and/or Quality of Service (QOS) information describing latency requirements of delayed buffered data.

18. The apparatus of claim 16 wherein the logic unit determines if the receiving node is experiencing congestion by determining that a threshold is reached for outgoing buffered data.

* * * * *